Figures 1, 2:
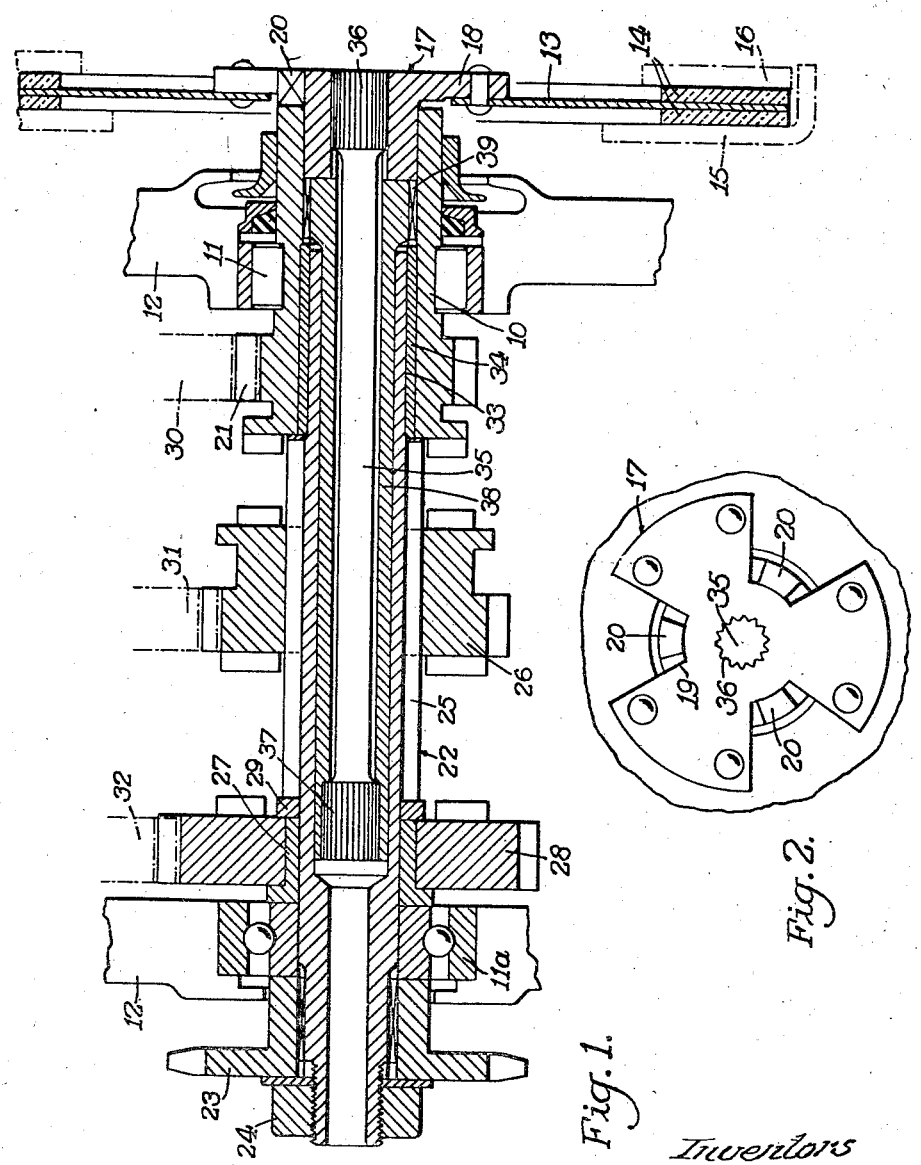

Sept. 17, 1946. G. F. HALLIDAY ET AL 2,407,955
CONNECTION OF CLUTCHES TO SPEED GEARS
Filed Nov. 13, 1944

Inventors
George F. Halliday
Albert W. Thomas
By [signature]
Atty.

Patented Sept. 17, 1946

2,407,955

UNITED STATES PATENT OFFICE 2,407,955

CONNECTION OF CLUTCHES TO SPEED GEARS

George Frederic Halliday and Albert William Thomas, Kingswood, Bristol, England, assignors to Douglas (Kingswood) Limited Application November 13, 1944, Serial No. 563,162
In Great Britain September 28, 1943

4 Claims. (Cl. 192—20)

1

This invention relates to the connection of clutches and the like to speed gears, and it has for its object to provide an improved form and construction of such connection embodied in a gear box. It is a further object of the invention to provide an improved shaft assembly which is particularly suitable for incorporation in the driving installations of motor bicycles and like vehicles.

According to the invention there is provided in a gear box, a cushion drive which is operative between two coaxial members and which comprises a spring of the straight torsion bar type connected rigidly at its ends with the said two members respectively.

Further, there is provided in a gear box a shaft assembly comprising a tubular member, a drive member coaxial therewith, a torsion bar spring disposed within the tubular member, a rigid connection between one end of the spring and the tubular member, and a rigid connection between the other end of the spring and the drive member.

Preferably a positive driving connection permitting lost motion is also operative between the said coaxial members, and acts to limit the relative angular movement of these members and thus to limit the stress to which the torsion bar spring can be subjected. The torsion bar spring may be operatively connected at one end with the driven element of a friction clutch and at the other end with a toothed gear wheel within the gear box, a tubular member surrounding the torsion bar conveniently constituting the connection between said torsion bar and the toothed gear wheel. If desired the output shaft of the gear box may be tubular and accommodate the torsion bar spring within its bore. The above-mentioned toothed gear wheel may be formed with or mounted upon a sleeve, which latter is connected directly with the clutch element by a coupling permitting relative angular movement of the clutch element and the sleeve. Preferably axial projections, formed upon the end of the sleeve, extend with substantial circumferential clearance into apertures in the clutch element.

The preferred embodiment of the invention is illustrated in the accompanying diagrammatic drawing, in which:

Figure 1 is a sectional plan of a main shaft assembly of a motor bicycle gear box, the driven plate of the clutch also being included; and Figure 2 is a fragmentary end elevation of the clutch plate boss.

The main shaft assembly comprises a pinion

2 sleeve 10 which is rotatable in a roller bearing 11, carried by the casing of the gear box indicated at 12. The usual clutch has a single driven plate 13 the marginal part of which is fitted with a pair of annular facings 14 arranged to be frictionally gripped in an axial direction between a pair of members 15 and 16 constituting the driving element of the clutch; this element is, of course, normally driven from the engine either directly or by means of the primary chain (not shown). At the centre of the clutch plate 13 is a hub member 17 the flange portion 18 of which is interrupted as shown in Figure 2 so as to produce a plurality of gaps 19, into which project a corresponding number of dogs 20 formed upon the outer end of the pinion sleeve 10. These dogs 20 are substantially narrower than the gaps 19 and consequently serve as a lost motion connection between the hub member 17 and the pinion sleeve 10; when the lost motion has been taken up, however, the dogs 20 receive a positive drive from the hub member 17. At its inner end the pinion sleeve 10 has a series of gear teeth 21 producing a driving pinion.

The output shaft of the gear box is indicated at 22. Its left-hand end is mounted in the gear box casing 12 by means of a bearing 11a and is fitted with a sprocket 23 by which the drive is imparted to the rear wheel of the motor bicycle, the sprocket being splined to the shaft, and being clamped axially by a nut 24. The main shaft is also splined at 25 for the slidable reception of an intermediate gear wheel 26 in the usual manner, and the end of these splines is utilised as a shoulder against which a bearing sleeve 27 for gear wheel 28, and a washer 29 are clamped, also by the nut 24. It will be understood that the gears 21, 26 and 28, and the lay-shaft gears 30, 31 and 32 with which they mesh, are the usual components of the gear box and are therefore represented purely diagrammatically. At its right-hand end, beyond the splines 25, the output shaft 22 has a cylindrical portion 33 rotatable in a bearing bush 34 which is fitted into the pinion sleeve 10. The output shaft extends within the bearing 11, thus fully supporting the pinion sleeve 10, but at the same time permitting the parts to rotate relatively.

The output shaft 22 is tubular and provides accommodation for resilient buffer means operatively interposed between the clutch plate 13 and the pinion sleeve 10 so as to cushion the drive, and thus absorb shocks during acceleration and deceleration. These resilient means comprise a torsion rod 35 composed of tempered steel. Its ends 36 and 37 are enlarged in diameter and are splined so as to be engaged in a nonrotatable manner with the hub member 17, and with an intermediate tubular member 38 respectively. This intermediate tubular member is freely rotatable within the output shaft 22, its right-hand end being enlarged at 39, where it is externally splined for interlocking engagement with the pinion sleeve 10. The torsion bar is initially installed so that the dogs 20 lie centrally between the radial walls of the gaps 19 when the torsion bar is unstressed; therefore, as a drive is imparted to the clutch plate 13 it causes the torsion bar 35 to be twisted to an extent depending upon the resistance to movement of the pinion sleeve 10, and consequently of the intermediate tubular member 38. Thus the drive is applied to the pinion sleeve 10 in a resilient manner, but should the resistance be excessive, the dogs 20 are engaged positively by the hub member 17, thereby preventing the torsion rod 35 being overstrained.

It will be understood that the construction which has been described is given by way of example, and that various modifications may be made. For instance, where extreme compactness is desired, the intermediate tubular member 38 may be designed so as to be deflected torsionally and thus to add substantial resilience to that of the torsion rod 35. This may readily be achieved by slitting the tubular member 38 longitudinally, said tubular member of course being composed of suitable material, such as tempered steel. Moreover, the torsion spring (or another torsion spring) may be interposed between the gearing of the gear box and the output shaft.

What we claim is:

1. In a gear box and clutch unit, including a driven clutch element, a cushion drive device, including a straight torsion bar spring, a tubular member enclosing said torsion bar and rigidly connected thereto at its inner end, a rigid connection between the driven clutch element of the unit and the outer end of the torsion bar, a lost motion connection operating between the outer end of the tubular member and the said driven element of the clutch to limit the angle of twist of the torsion bar, a tubular shaft providing the power output shaft of the said gear box, the tubular member and torsion bar being disposed within the bore of the tubular shaft, and a toothed gear wheel splined to the outer end of the tubular member beyond the tubular output shaft, said gear wheel serving to transmit the drive within the gear box of the unit.

2. A gear box and clutch unit according to claim 1, having a sleeve member which surrounds the end of the tubular shaft, connected rigidly with the outer end of the said tubular member, and formed externally with teeth to serve as the said gear wheel.

3. A gear box and clutch unit according to claim 1, having a sleeve member which surrounds the end of the tubular shaft, connected rigidly with the outer end of the said tubular member, and formed externally with teeth to serve as the said gear wheel, the said sleeve member having at its outer end a circumferential series of axially directed dogs to engage with apertures in the driven member of clutch and which have circumferential freedom within said apertures to provide the said lost motion connection.

4. In a gear box and clutch unit, a cushion drive device comprising a sleeve member extending through the gear box wall and rotatably mounted therein, a driven clutch member rotatably fitting within the outer end of said sleeve member, dogs formed on the outer end of the sleeve member and operating in apertures in the driven clutch member to form an angular lost motion, a circumferential series of gear teeth upon the inner part of the sleeve member to transmit the drive within the gear box, a tubular power output shaft with one end rotatably mounted in the gear box wall, the other end fitting rotatably within the sleeve member, a tubular member disposed within the power output shaft with its outer end secured rigidly to the sleeve member, and a torsion bar spring disposed within said tubular member, the inner end of the torsion bar spring being rigidly attached to the corresponding end of the tubular member, while the outer end of said spring is attached rigidly to the clutch driven member.

GEORGE FREDERIC HALLIDAY.
ALBERT WILLIAM THOMAS.